United States Patent [19]

Harakawa et al.

[11] Patent Number: 5,224,970
[45] Date of Patent: Jul. 6, 1993

[54] ABRASIVE MATERIAL

[75] Inventors: Masaji Harakawa; Mikio Hayashi, both of Niihama, Japan

[73] Assignee: Sumitomo Chemical Co., Ltd., Osaka, Japan

[21] Appl. No.: 879,458

[22] Filed: May 4, 1992

Related U.S. Application Data

[63] Continuation of Ser. No. 486,410, Feb. 28, 1990, abandoned.

[30] Foreign Application Priority Data

Mar. 1, 1989 [JP] Japan .................................. 1-49114

[51] Int. Cl.$^5$ .............................................. C09K 3/14
[52] U.S. Cl. ........................................ 51/298; 51/307; 51/309; 524/437; 523/442; 523/443
[58] Field of Search ................ 51/298, 309, 308, 307; 524/397, 437, 428; 523/442, 443; 501/95

[56] References Cited

U.S. PATENT DOCUMENTS

| | | |
|---|---|---|
| 3,524,286 | 8/1970 | Wohrer ................................. 51/298 |
| 3,619,152 | 11/1971 | Yalof . |
| 3,972,161 | 8/1976 | Zoiss ................................. 51/298 X |
| 4,259,089 | 3/1981 | Waizer et al. ..................... 51/298 X |
| 4,757,036 | 7/1988 | Kaar ................................. 501/10 X |
| 4,921,819 | 5/1990 | Ramachardran ..................... 501/127 |

FOREIGN PATENT DOCUMENTS

| | | |
|---|---|---|
| 51-48793 | 12/1976 | Japan . |
| 6352972 | 3/1983 | Japan . |
| 59-97845 | 6/1984 | Japan . |
| 61-244465 | 10/1986 | Japan . |
| 61-279469 | 12/1986 | Japan . |
| 63-52972 | 3/1988 | Japan . |
| 0149114 | 12/1990 | Japan . |

*Primary Examiner*—Karl Group
*Attorney, Agent, or Firm*—Birch, Stewart, Kolasch & Birch

[57] ABSTRACT

An abrasive material in a shaped form usable for grinding, abrading or cutting various articles, which has high abrasion performance and high mechanical strength and is characterized in comprising alumina fibers of 3 to 100 $\mu$m in diameter and not more than 10% in coefficient of variation of diameter bonded with a resin.

15 Claims, No Drawings

ABRASIVE MATERIAL

This application is a continuation of U.S. patent application Ser. No. 07/586,410 filed on Feb. 28, 1990, now abandoned.

The present invention relates to an abrasive material. More particularly, it relates to an abrasive material in a shaped form for grinding or abrading an article made of metals, ceramics, glasses, resins, rubbers, composite materials, etc.

Conventional abrasive materials comprise natural or artificial grains (e.g., diamond, garnet, silica, fused alumina, calcined alumina, zirconium oxide, titanium oxide, silicon carbide, silicon nitride, boron nitride) bonded by the aid of resins, metals, etc., usually on a substrate such as metal (e.g., casting metal), paper, cloth or non-woven fabric, or adhered thereto with resins or metals. In these abrasive materials, grains constitute only a portion of the surface and are apt to drop on processing so that their grinding or abrading efficiency is low and their durability is insufficient. In order to solve these problems, the incorporation of grains in large amounts was attempted, but in such case, the resulting abrasive materials decrease in strength and their cutting surfaces are curved so that the abrasion precision is deteriorated.

As the prior art, it is known to reinforce grindstones with silicon carbide fibers (JA-A-52-003796), glass fibers (JP-A-54-082786, JP-A-55-131473), carbon fibers (JP-A-63-034072), etc. It is also known to use a resin matrix composite reinforced with continuous fibers as the abrasive material, examples of said continuous fibers being glass fibers (JP-A-59-097845), boron fibers (U.S. Pat. No. 3,619,152, U.S. Pat. No. 3,972,161, Proc. Abras. Eng. Soc., 26, 1-17 (1988)), etc.

Such abrasive materials as fiber-reinforced grindstones have a lowered content of abrasive grains so that the abrasion efficiency and the durability are deteriorated, resulting in poor abrasion precision. Also, the abrasive materials using composite materials reinforced with continuous fibers are inferior in some physical properties. For instance, those using glass fibers are inferior in hardness, heat resistance, modulus, etc. so that their grinding or abrasion performance and durability are unsatisfactory. Further, for instance, those using boron fibers are excellent in hardness, strength, modulus, etc., but their smoothness of finished surface is not sasifactory due to their large fiber diameter. In addition, boron fibers are deficient in chemical stability so that abrasive materials comprising them produce a problem when used at a high temperature or under a corrosive environment.

A basic object of the present invention is to provide an abrasive material comprising alumina fibers bonded by the aid of a resin, which obviates all the problems as hereinabove stated.

Throughout the specification, the term "abrasive material" covers any material which is used for grinding, abrading or cutting various articles made of metals, ceramics, glasses, resins, rubbers, composite material, etc.

As the alumina fibers, there may be used any conventional one. In order to attain a high abrasion performance, the use of alumina fibers having a high strength and a high hardness, especially a tensile strength of not less than 100 kg/mm$^2$ and a Mohs' hardness of not less than 4, is preferred. In particular, the use of alumina fibers comprising not less than 60% by weight of $Al_2O_3$ and not more than 30% by weight of $SiO_2$ and not showing any material reflection due to alpha-$Al_2O_3$ in the X-ray structure analysis is favorable. Since the alumina fibers having these characteristics are composed of very fine crystals and are densely and tightly sintered, they possess high strength, high modulus and high hardness. Further, such alumina fibers are appropriately active at the surface and can firmly adhere to a resin. In addition, alumina fibers are generally stable to heat and corrosion so that they do not deteriorate due to chemical reaction. Also an article to be ground or abraded is not damaged by them.

The alumina fibers used in this invention desirably have a length of not less than 10 mm, preferably not less than 15 mm, more preferably not less than 20 mm, in view of their reinforcing effect on the mechanical strength. When the alumina fibers are continuous, they may be used as such or in any processed form such as a fabric, a knitted sheet or a braided sheet. A larger diameter of the alumina fibers gives a more excellent abrasion efficiency but affords an inferior smoothness at the ground or abraded surface. The diameter of the alumina fibers may be appropriately chosen depending on their use, and is usually from about 3 to 100 microns, preferably from about 3 to 80 microns, more preferably from about 3 to 50 microns. Since the variation in diameter results in deterioration of the abrasion precision, it is favorable to retain the coefficient of variation not more than 10%, more preferably not more than 8%.

The abrasive material according to the invention may comprise, in addition to the alumina fibers as the major component, other fibers such as carbon fibers, aramid fibers, boron fibers, silicon carbide fibers, silicon nitride fibers and glass fibers to improve or enhance various physical properties such as strength, impact resistance, electrical insulation, thermal conductivity and so on.

For bonding the alumina fibers and, when used, other fibers, there may be used any conventional resin, of which typical examples are thermosetting resins (e.g., epoxy resin, phenol resin, unsaturated polyester resin, vinyl ester resin, alkyd resin, urea-formaldehyde resin, polyimide resin), thermoplastic resins (e.g., polyethylene, polypropylene, polymethyl methacrylate, polystyrene, polyvinyl chloride, ABS resin, AS resin, polyacrylamide, polyacetal, polysulfone, polycarbonate, polyphenylene oxide, polyether sulfone, polyether ether ketone, polyamideimide), etc. Among them, particularly preferred are epoxy resins, phenol resins, unsaturated polyester resins, polyimide resins, etc.

Bonding of the alumina fibers and optionally other fibers with a resin may be accomplished by any conventional procedure as adopted for manufacture of fiber-reinforced composite materials. When the resin is thermosetting, the fibers may be impregnated with the resin in a non-cured or semi-cured state or in a solution in an appropriate solvent. When the resin is thermoplastic, the fibers may be impregnated with the resin in a molten state or in a solution in an appropriate solvent. In case of the fibers being short-cut, they may be as such admixed with a resin, or alternatively they may be processed in any appropriate form such as a non-woven fabric and then admixed with a resin.

In order to mold the alumina fiber-reinforced abrasive material in various forms (e.g., plate, stick, pipe, disk), there may be used any procedure as conventionally adopted for manufacture of a fiber-reinforced composite material. In case of the fibers being continuous, prepreg lamination, filament winding, pultrusion or the like may be used. In case of the fibers being short-cut, injection molding or the like may be used. When desired, the abrasive material may be provided with a groove, a hole or the like to allow easy discharge of shaved wastes, the flow of a lubricant, or the like.

The mechanical strength and the abrasion efficiency are more improved with a higher amount of the alumina fibers contained in the abrasive material, and it may be usually from about 20 to 80% by volume.

The angle of the alumina fibers in the abrasive material affords a great influence on the abrasion performance and the mechanical strength of the abrasive material. In order to enhance the abrasion performance, it is favored that the alumina fibers in the abrasive material are contacted with the surface of the article with a sharper angle. On the other hand, the alumina fibers are favored to be arranged in the direction of stress to achieve high strength and a high modulus. Thus, the abrasive material of the invention may be appropriately designed so as to meet the above condtions to a possibly maximum extent so that excellent abrasion performance and mechanical properties can be attained.

The abrasive material of the invention is superior to conventional abrasive materials comprising abrasive grains or glass fibers in various properties such as precision, efficiency and durability for grinding, abrading or cutting articles made of metals, ceramics, glasses, resins, rubbers, compositie materials, etc. Thus, the alumina fibers as the major component in the abrasive material according to this invention have high strength, high modulus and high hardness and, in addition, can be chosen from those having a wide variety of diameters so that the abrasive material comprising them can accomplish grinding, abrasion or cutting more economically with a higher precision and within a shorter time than conventional abrasive materials. Further, the alumina fibers have excellent corrosion resistance, good oxidation resistance and high thermal conductivity so that no reaction takes place due to the friction heat or on the article to be ground or abraded. Therefore, the abrasive material comprising them can be applied with high abrasion efficiency and precision to an article or under a condition to which conventional abrasive materials could not be applied. Moreover, the alumina fibers work themselves as a reinforcing material so that the resultant abrasive material is excellent in mechanical strength.

As stated above, the abrasive material of the invention can be used to grind, abrade and cut various articles. Specifically, it may be used as a grindstone, a dresser for grind wheels and cutters or the like.

Practical and presently preferred embodiments of the invention will be illustratively shown in the following examples wherein part(s) are by weight unless otherwise indicated.

EXAMPLE 1

A mixture (100 parts) of "Sumiepoxy ELA-134" ® (bis-A type epoxy resin; Sumitomo Chemical Co., Ltd.) (60% by weight) and "Sumiepoxy ESCN-220H" ® (cresol-novolak type epoxy resin; Sumitomo Chemical Co., Ltd.) (40% by weight) was admixed with dicyanediamide (5 parts) and 3-(3,4-dichlorophenyl)-1,1-dimethylurea (4 parts). The resulting mixture was, after heating at 75° C., applied onto a releasing paper as continuously running and passed through a doctor knife to make a resin film.

Separately, continuous alumina fibers "Altex" ® (85% by weight of $Al_2O_3$; 15% by weight of $SiO_2$; average diameter of 15 μm; coefficient of variation of diameter of 3%; density of 3.2 g/cm$^3$; tensile strength of 185 kg/mm$^2$; Mohs' hardness of 8.2; Sumitomo Chemical Co., Ltd.) arranged in unidirection were spread to make a sheet, which was sandwiched in two resin films as obtained above and pressed by a press roll at 120° C. under a linear pressure of 3 kg/cm, followed by elimination of the releasing papers to give a prepreg having a fiber areal weight of 330 g/m$^2$. The prepreg was cut into squares (each 30 cm×30 cm), and 42 plys were laminated, put in a metal mold and pressed at 120° C. under a pressure of 5 kg/cm$^2$ to make a cured plate. The plate was cut by the aid of a diamond saw into a stick-type abrasive material (10×1×50 mm). The abrasive material was installed in an ultrasonic polisher (Stanley Electric Co., Ltd.) and used for polishing a pre-hardened steel-made mold for injection molding of 29 inch TV cabinets.

In the same manner as above but using continuous fibers such as "FP" ® (tensile strength of 140 kg/mm$^2$; Mohs' hardness of 7.3; DuPont de Nemours & Co.), "Alcen" ® (tensile strength of 160 kg/mm$^2$; Mohs' hardness of 6.0; Denki Kagaku Kogyo K.K.) and "Nextel 312" ® (tensile strength of 160 kg/mm$^2$; Mohs' hardness of 6.5; Minnesota Mining & Mfg. Co.) as the aluminum fibers in place of "Altex", the stick-type abrasive material was prepared. With this abrasive material, a pre-hardened steel-made mold was polished.

Evaluation was made on the abrasion properties of each abrasive material, and the results are shown in Table 1.

TABLE 1

| Item | Alumina fibers | | | |
|---|---|---|---|---|
| | Altex | FP | Alcen | Nextel |
| Time required for polishing (min)*[1] | 40 | 60 | 90 | 90 |
| Abrasion precision (μm)*[2] | 0.5 | 1.2 | 0.8 | 0.8 |
| Limit of working (hr)*[3] | 10 | 8 | 6 | 5 |

Note:
*[1] Time until the abrasion precision becomes maximum
*[2] Measured by the method of JIS B0601-1982 and represented by an average roughness at the center line
*[3] Usable total time

EXAMPLE 2

Alumina fibers "Altex" ® (average diameter of 15 μm, coefficient of variation of diameter of 3%) were processed into a plain weave fabric having a fiber areal weight of 630 g/m$^2$, which was impregnated with a mixture of "Sumiepoxy ELA-128" ® (epoxy resin, Sumitomo Chemical Co., Ltd.) (100 parts), dicyanediamide (Nippon Shokubai Kagaku Kogyo Co., Ltd.) (5 parts) and "DIURON" ® (DuPont de Nemours & Co.) (4 parts) to make a prepreg, from which round sheets (each diameter of 100 mm) having a punched hole of 15 mm in diameter at the center were cut. A laminate of ten round sheets was put in an off-set mold and pressed at 120° C. under a pressure of 5 kg/cm$^2$ for 2 hours, whereby an abrasive material having a fiber content of 55% by volume was obtained. The abrasive material was installed in a 100 mmφ off-set grinder (Hitachi, Ltd.), and a convex portion at the surface of an automobile tire was ground in 4 mm width with a rotation speed of 1200 rpm. As the result, grinding could be made up to the length of 2000 mm giving a fine cut surface without any depression of the rotation speed.

EXAMPLE 3

A sheet of alumina fibers "Altex" ® (average diameter, 10 μm; coefficient of variation of diameter of 4%) arranged in unidirection was impregnated with a mixture of "Sumiepoxy ELM-434" ® (epoxy resin, Sumitomo Chemical Co., Ltd.) (100 parts) and "Sumicure-S" ® (diaminodiphenylsulfone; Sumitomo Chemical Co., Ltd.) (40 parts) to make a prepreg having a fiber areal weight of 150 g/mm². The prepreg thus obtained was laminated with an angle of ±45° (outer diameter of 10 mm; thickness of 1.5 mm), followed by curing at 180° C. under a pressure of 6 kg/cm² for 2 hours to make an abrasive material having an alumina fiber content of 61% by volume. Five pieces of pipe of the abrasive material were fixed on a turn table, and grinding of a single crystal ferrite (28.6 mmφ) was performed at a circumferential speed of 122 m/min under an abrasion pressure of 2.5 kg/inch². As the result, the abrasion precision was 0.1 μ, and the abrasion speed was 20 μ/inch².min.

EXAMPLE 4

A sheet of alumina fibers "Altex" ® (average diameter of 15 μm; coefficient of variation of diameter of 3%) arranged in unidirection was impregnated with phenol resin "GP104" ® (Gunei Chemical Industry Co., Ltd.) to make a prepreg having a fiber areal weight of 125 g/m². The prepreg thus obtained was laminated around a mandrel of 10 mmφ in 0° by fiber volume fraction of 6% and ±30° by fiber volume fraction of 54%. A polyester tape was wound around the prepreg layer with a tension of 5 kg/cm² and cured at 120° C. for 1 hour. After a post-cure at 180° C. for 2 hours, the mandrel was taken off to give an abrasive material in pipe. Dressing of a diamond saw was effected with this abrasive material. The dressing time for the saw, i.e., the time for recovery of the cutting performance, was 1 minute, and the dressing could be effective 38 times.

COMPARATIVE EXAMPLE 1

In the same manner as in Example 1 but using glass fibers (average diameter of 10 μm; Nihon Glass and Fiber K.K.) or boron fibers (average diameter of 100 μm; Textron K.K.) in place of alumina fibers, an abrasive material was prepared, and this abrasive material was used for polishing a mold to evaluate its abrasive properties. The results are shown in Table 2.

TABLE 2

| Item | Boron fibers | Glass fibers |
| --- | --- | --- |
| Time required for polishing (min) | 30 | 180 |
| Abrasion precision (μm) | 5 | 1 |
| Limit of working (hr) | 11 | 1 |

COMPARATIVE EXAMPLE 2

In the same manner as in Example 2 but using glass fibers "MG-430" ® (average diameter of 12 μm; Asahi Fiber Glass K.K.) processed in a cloth in place of alumina fibers processed in a plain weave fabric, an abrasive material was prepared, and this abrasive material was used for grinding a convex portion at the surface of an automobile tire in a 4 mm width. The grinding speed lowered considerably when the length of grinding reached 1000 mm, and any material grinding over the length of 1500 mm was not possible. The cut surface showed considerable unevenness and was not fine.

COMPARATIVE EXAMPLE 3

In the same manner as in Example 3 but using glass fibers "RS240G" ® (average diameter of 8 μm; Nitto Boseki Co., Ltd.) in place of alumina fibers, an abrasive material was prepared. When used for dressing a diamond saw, the dressing time was 3 minutes, and the dressing could be effective 10 times.

What is claimed is:

1. A method for abrading an article, which comprises grinding, abrading, or cutting said article by slidably contacting said article with an abrasive material in a shaped form consisting essentially of continuous alumina fibers having a length of not less than 10 mm bonded with a resin, wherein said alumina fibers are present in said abrasive material in an amount of from about 20 to 80% by volume.

2. The method according to claim 1, wherein said alumina fibers have a diameter of 3 to 100 μm.

3. The method according to claim 1, wherein said alumina fibers have a coefficient of variation of diameter of not more than 10%.

4. The method according to claim 1, wherein said alumina fibers possess a tensile strength of not less than 100 kg/mm² and a Mohs' hardness of not less than 4.

5. The method according to claim 1, wherein said alumina fibers comprises not less than 60% by weight of $Al_2O_3$, not more than 30% by weight of $SiO_2$, and which do not exhibit any material reflection due to alpha-$Al_2O_3$ in X-ray structural analysis.

6. The method according to claim 1, wherein said alumina fibers have a length of not less than 15 mm.

7. The method according to claim 1, wherein said alumina fibers have a length of not less than 20 mm.

8. The method according to claim 1, wherein said continuous alumina fibers are in the form of a fabric, a knitted sheet, or a braided sheet.

9. The method according to claim 1, wherein said alumina fibers have a diameter of from about 3 to 80 μm.

10. The method according to claim 1, wherein said alumina fibers have a diameter of from about 3 to 50 μm.

11. The method according to claim 3, wherein said alumina fibers have a coefficient of variation of diameter of not more than 8%.

12. The method according to claim 1, wherein said abrasive material further comprises other fibers selected from the group consisting of carbon fibers, aramid fibers, boron fibers, silicon carbide fibers, silicon nitride fibers, and glass fibers.

13. The method according to claim 1, wherein said resin is selected from the group consisting of a thermosetting resin and a thermoplastic resin.

14. The method according to claim 13, wherein said thermosetting resin is selected from the group consisting of an epoxy resin, a phenol resin, an unsaturated polyester resin, a vinyl ester resin, an alkyd resin, a urea-formaldehyde resin, and a polyimide resin.

15. The method according to claim 13, wherein said thermoplastic resin is selected from the group consisting of polyethylene, polypropylene, polymethyl methacrylate, polystyrene, polyvinyl chloride, ABS resin, AS resin, polyacrylamide, polyacetal, polysulfone, polycarbonate, polyphenylene oxide, polyether sulfone, polyether ketone, and polyamideimide.

* * * * *